Figure 1:
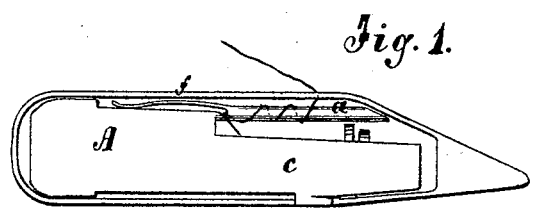

M. & M. G. COOK.
Shuttle for Sewing-Machines.

No. 129,004.  Patented July 16, 1872.

Witnesses:
A Bennemendorf
W. A. Graham

Inventors
M. Cook
M. G. Cook
Per  Munn
Attorneys.

UNITED STATES PATENT OFFICE.

MOSES COOK AND MOSES G. COOK, OF ASHFIELD, MASSACHUSETTS.

IMPROVEMENT IN SHUTTLES FOR SEWING-MACHINES.

Specification forming part of Letters Patent No. 129,004, dated July 16, 1872.

Specification describing a Shuttle Thread-Tension, invented by MOSES COOK and MOSES G. COOK, of Ashfield, in the county of Franklin and State of Massachusetts.

The drawing is a side elevation showing my invention.

A represents a retaining-plate hinged in and at one end of the shuttle. This is provided with a longitudinal rod, $a$, which has a side spring, $f$. The thread from the spool is first passed under spring $f$; then coiled around the rod $a$; then finally carried out through a hole in the side of the shuttle. By passing first around the spring $f$, previously to being coiled on the rod $a$, the several coils are prevented from crowding on one another and causing the thread to bind.

Having thus described our invention, what we claim as new, and desire to secure by Letters Patent, is—

A shuttle, provided with plate A hinged at one end, and having rod $a$ with side spring $f$, as and for the purpose described.

: MOSES COOK.
MOSES G. COOK.

Witnesses:
H. S. RANNEY,
M. H. COOK.